United States Patent
Kim et al.

(10) Patent No.: US 10,034,351 B2
(45) Date of Patent: *Jul. 24, 2018

(54) LIGHTING DEVICE AND METHOD FOR CONTROLLING SAME

(71) Applicant: LG ELECTRONICS INC., Seoul (KR)

(72) Inventors: Jeonghwa Kim, Seoul (KR); Heegu Park, Seoul (KR); Seungwoo Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 13 days.

This patent is subject to a terminal disclaimer.

(21) Appl. No.: 15/378,477

(22) Filed: Dec. 14, 2016

(65) Prior Publication Data

US 2017/0171944 A1 Jun. 15, 2017

(30) Foreign Application Priority Data

Dec. 15, 2015 (KR) .................. 10-2015-0178795

(51) Int. Cl.
*F21V 23/06* (2006.01)
*H05B 37/02* (2006.01)
(Continued)

(52) U.S. Cl.
CPC ..... *H05B 37/0227* (2013.01); *F21V 23/0471* (2013.01); *F21V 23/06* (2013.01);
(Continued)

(58) Field of Classification Search
CPC ............... H05B 37/02; H05B 37/0227; H05B 37/0245; H05B 37/0263; H05B 37/0272;
(Continued)

(56) References Cited

U.S. PATENT DOCUMENTS 6,388,399 B1 * 5/2002 Eckel ................ G01K 1/024
315/158
7,888,875 B2 2/2011 Sibout
(Continued)

FOREIGN PATENT DOCUMENTS

KR 20-2009-0006143 6/2009
KR 10-1316871 10/2013
(Continued)

OTHER PUBLICATIONS

U.S. Office Action dated Jul. 17, 2017 issued in co-pending U.S. Appl. No. 15/378,376.
(Continued)

*Primary Examiner* — Haissa Philogene
(74) *Attorney, Agent, or Firm* — KED & Associates, LLP

(57) ABSTRACT

A lighting device may include a light illumination portion, a light control portion, a sensing portion, a main control module, and a first connector. The light illumination portion may generate and illuminate light. The light control portion may control power applied to the light illumination portion. The sensing portion may include a sensor that senses an environment of a space to which the light illumination portion illuminates light. The main control module may be capable of communicating with an external device by a wireless communication and may control the light control portion according to a control signal from the external device. The first connector may be provided in the main control module and may connect the main control module and the sensing portion. The sensing portion may include a switch by which an operating signal of a user is input. Accordingly, a user is capable of conveniently using a sensor and a switch together.

20 Claims, 6 Drawing Sheets

(51) Int. Cl.
*H05B 33/08* (2006.01)
*F21V 23/04* (2006.01)
*F21Y 115/10* (2016.01)

(52) U.S. Cl.
CPC ..... *H05B 33/0854* (2013.01); *H05B 37/0272* (2013.01); *F21Y 2115/10* (2016.08)

(58) Field of Classification Search
CPC . H05B 33/0854; H05B 33/0872; F21V 23/06; F21V 23/0471; F21V 23/003; F21V 23/0464; F21V 23/471; Y02B 20/48; F21Y 2115/10
See application file for complete search history.

(56) References Cited

U.S. PATENT DOCUMENTS

| | | | |
|---|---|---|---|
| 8,033,686 B2 | 10/2011 | Recker | |
| 8,901,825 B2 * | 12/2014 | Reed | H05B 37/0218 315/149 |
| 8,915,843 B2 * | 12/2014 | Shimada | H05B 37/02 315/149 |
| 8,952,626 B2 * | 2/2015 | Huang | H05B 37/0272 315/158 |
| 9,024,536 B2 | 5/2015 | Maxik | |
| 9,247,623 B2 * | 1/2016 | Recker | H05B 33/0803 |
| 9,289,574 B2 | 3/2016 | Maxik | |
| 9,295,144 B2 | 3/2016 | Bora | |
| 9,320,101 B2 | 4/2016 | Sun | |
| 9,408,282 B1 | 8/2016 | Springer | |
| 9,536,452 B2 * | 1/2017 | Lydecker | G09B 21/008 |
| 9,538,620 B2 | 1/2017 | Kim | |
| 9,538,623 B2 | 1/2017 | Lee | |
| 9,549,110 B2 | 1/2017 | Chien | |
| 9,603,226 B2 | 3/2017 | Sagal | |
| 9,863,623 B2 * | 1/2018 | Kim | F21V 3/00 |
| 9,897,300 B2 * | 2/2018 | Kim | F21V 23/06 |
| 2007/0147017 A1 | 6/2007 | Eom | |
| 2015/0327349 A1 | 11/2015 | Lee | |
| 2017/0130907 A1 | 5/2017 | Cho | |
| 2017/0167708 A1 | 6/2017 | Kim | |
| 2017/0167709 A1 | 6/2017 | Kim | |
| 2017/0171944 A1 | 6/2017 | Kim | |

FOREIGN PATENT DOCUMENTS

| | | |
|---|---|---|
| KR | 10-2014-0056995 | 5/2014 |
| KR | 10-2014-0060675 | 5/2014 |
| KR | 10-2014-0098570 | 8/2014 |
| KR | 10-2014-0024583 | 6/2015 |
| KR | 10-2015-0135862 | 12/2015 |
| KR | 10-1617293 | 5/2016 |

OTHER PUBLICATIONS

Korean Notice of Allowance dated Feb. 1, 2017 issued in Application No. 9-5-2017-007973831.
U.S. Notice of Allowance issued in U.S. Appl. No. 15/378,616 dated Sep. 13, 2017.
Korean Office Action dated May 22, 2017 issued in Application No. 10-2015-0178795.

* cited by examiner

LIGHTING DEVICE AND METHOD FOR CONTROLLING SAME

CROSS-REFERENCE TO RELATED APPLICATION

The present application claims priority under 35 U.S.C. 119 and 35 U.S.C. 365 from Korean Patent Application No. 10-2015-0178795, filed Dec. 15, 2015, the subject matter of which is hereby incorporated by reference.

BACKGROUND

1. Field

Embodiments may relate to a lighting device and a method for controlling the lighting device.

2. Background

A light emitting diode has been widely used rather than an incandescent lamp and/or a fluorescent lamp. The light emitting diode (LED) is a type of semiconductor device that converts electrical energy into light. Since the light emitting diode has advantages that are capable of obtaining low power consumption and semi-permanent lifetime compared to a light source such as fluorescent lamps and incandescent lamps, the light emitting diode may be used as a light source of a lighting device such as various liquid crystal display devices, electric sign boards, and street lamps (used indoors and outdoors).

The light emitting diode may be capable of realizing excellent controllability, fast response speed, high electric/light conversion efficiency, high luminance, and/or emotional illumination. Due to characteristics of these devices, the lighting device using the light emitting diode may be positively controlled depending on time and place.

Technologies for saving more power consumption or for more positively controlling the lighting device according to a user's demand have attracted attention. For example, when a moving body sensor determines that there is no person in a lighting space for a predetermined period of time, then the lighting device may be automatically turned off, and when the moving body sensor determines that there is a person in the lighting space, then the lighting device may be automatically turned on.

In order to positively control the lighting device, a communication device may be mounted on the lighting device such that the lighting device is capable of operating according to a control signal from outside of the lighting device. For example, a communication module mounted on an inside of the lighting device is disclosed in Korean Patent Application No. 10-2014-0028495, filed Mar. 11, 2014 (filed by the present applicant), the subject matter of which is incorporated herein by reference.

In the above technology, technology is disclosed in which the communication module is mounted on an inside of the lighting device, and the communication module performs communication with a remote control device. This technology may not be introduced separately for a sensor.

Korean Patent Laid-Open Publication No. 10-2014-0098570, filed Jan. 31, 2013, the subject matter of which is incorporated herein by reference, discloses a technology that allows a sensing signal from a sensor to be transmitted to a gateway, and a controller that controls the gateway and thus controls a light irradiation portion. Korean Patent Laid-Open Publication No. 10-2014-0098570 was filed by the present applicant, and includes a technology for a sensor capable of interlocking with the lighting device.

According to this technology, a sensor and a light irradiation portion are separate articles from each other and are independently installed and operated. Accordingly, a separate installer may register the sensor in a complicated process using a controller when installing the lighting device, and may register an operation system of the lighting device according to a sensing state of the sensor. Accordingly, if the sensor, the light irradiation portion, and the communication module are different from each other, then all separate installation processes are to be performed. The installation process may be more inconvenient because the installation process requires not only a hardware installation process but also a software installation process. Therefore, it may be difficult for a user to install the lighting device.

BRIEF DESCRIPTION OF THE DRAWINGS

Arrangements and embodiments may be described in detail with reference to the following drawings in which like reference numerals refer to like elements and wherein.

DETAILED DESCRIPTION

In the following description of embodiments, in order to facilitate understanding, the attached drawings and/or figures may be illustrated in a larger, smaller or modified form, unlike the reality.

Figure 1:
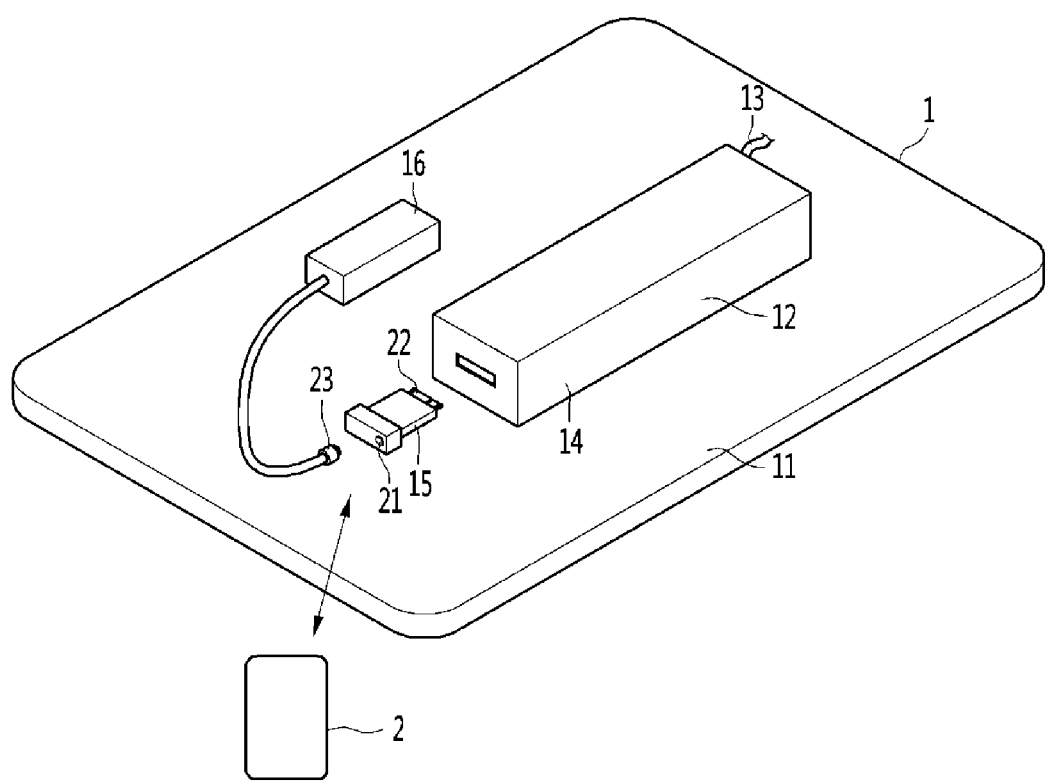
FIG. 1 is a view illustrating on operating state of a lighting device according to an embodiment.

FIG. 1 is a view illustrating an operating state of a lighting device according to an embodiment. Other arrangements and configurations may also be provided.

FIG. 1 shows a lighting device 1 for irradiating light and an external device 2 for transmitting a control signal for controlling the lighting device 1 in various methods using a control factor such as time, illuminance, and/or color. The external device may be a handheld device, for example, but any type of device including an input unit, a control unit (or controller), a memory, and/or a transmitting and receiving unit may be used. The transmitting and receiving unit may be a wireless transmitting and receiving unit.

The lighting device 1 may include a light irradiation portion 11, a light control portion 12, a sensing portion 16 and a main control module 15. The light irradiation portion 11 may irradiate light using a light emitting unit that is capable of being typified by a light emitting diode. The light control portion 12 may transmit light by controlling power applied to the light irradiation portion 11 using a predetermined method. The sensing portion 16 may be provided at one side of the light irradiation portion 11 and may sense various states of the environment on which the light irradiation portion 11 is provided. The main control module 15 may be connected to the light control portion 12 by wired communication, and may be connected to the external device 2 by wireless communication.

The main control module 15 and the sensing portion 16 may be connected (or coupled) in a detachable manner. The main control module 15 may be provided with a first connector 21 and a second connector 22. A connecting member 23 may be provided at an end of a connection line extending from the sensing portion 16. The main control module 15 may be a main control device or apparatus.

The main control module 15 and the light control portion 12 may be connected (or coupled) in a detachable manner. The main control module 15 may be provided with the second connector 22. The light control portion 12 may include a slot, such as slot 141 shown in FIG. 6.

The sensing portion 16 and the light control portion 12 are fastened to each other such that the sensing portion 16 and the light control portion 12 are detachable from the main control module 15. The specific connecting method of connecting components is not limited to the above described method. A method may be provided in which any one of both components is inserted, both components are connected to each other so that energization is possible, and positions of both components are physically fixed. Both components may be capable of being easily separated by a predetermined external force applied by an operator.

Various types of devices (such as a flat panel illumination, a fluorescent lamp, a down light, and/or a troffer) may be used for the light irradiation portion 11. A commercial power supply 13 may be applied to the light control portion 12, the electricity from the commercial power supply 13 may be regulated in accordance with the control signal from the main control module 15, and the electricity may then be applied to the light emitting unit of the light irradiation portion 11.

The light control portion 12 may be separated from the external environment by a case 14 that prevents foreign material from entering. The case 14 may be made of a metal for shielding electromagnetic waves and preventing fire.

Even if the main control module 15 is fastened to the light control portion 12, at least a portion of the main control module 15 (such as a wireless communication means that includes an antenna) may be exposed to an outside of the light control portion 12 for wireless transmission/reception with the external device 2.

Since the main control module 15 is exposed to outside of the lighting device 1, operations such as replacement of the sensing portion 16 or the main control module 15 may be performed after assembly of the lighting device is completed.

A method of using the lighting device may be described.

The user may select the desired sensing portion 16 at a store, for example. Examples of the sensor (of the sensing portion), which may be selected by the user, may include various type of sensors such as a moving body sensor capable of sensing movement, an illuminance sensor, a temperature sensor, a humidity sensor, a dust sensor, an ultraviolet sensor and/or a gas sensor, for example. A sensor in which two or more of the sensors are installed together may be selected. For example, a sensing portion having both the moving body sensor and the illuminance sensor may be selected. A line may extend in the sensing portion 16, and the connecting member 23 may be provided at an end of the extending line.

The user may select a desired light irradiation portion 11 and a light control portion 12 for controlling the selected light irradiation portion 11. A slot 141 may be provided at the light control portion 12. An installation area for mounting the sensing portion 16 may be provided at one side of the light irradiation portion 11. The sensing portion 16 may be installed downward at a mounting area. For example, the light irradiation portion 11 may be empty, or an edge portion of the light irradiation portion 11 may be an installation area.

The user may select the sensing portion 16, the light irradiation portion 11 and the light control portion 12, desired by the user, by using the main control module 15, and the user may assemble the sensing portion 16, the light irradiation portion 11 and the light control portion 12.

When a lighting device is installed at a desired place and power is applied to the lighting device, and software corresponding to types of a sensor in the sensing portion 16, the light irradiation portion and the light control portion may be read and then the lighting device may be installed. Information corresponding to various sensors, light irradiation portions, and light control portions may be stored, in advance, in memory of the main control module 15.

Thereafter, the lighting device may operate using the external device 2 in specific and various methods. For example, operations such as on/off, brightness adjustment, and/or illumination time setting may be performed.

Figure 2:
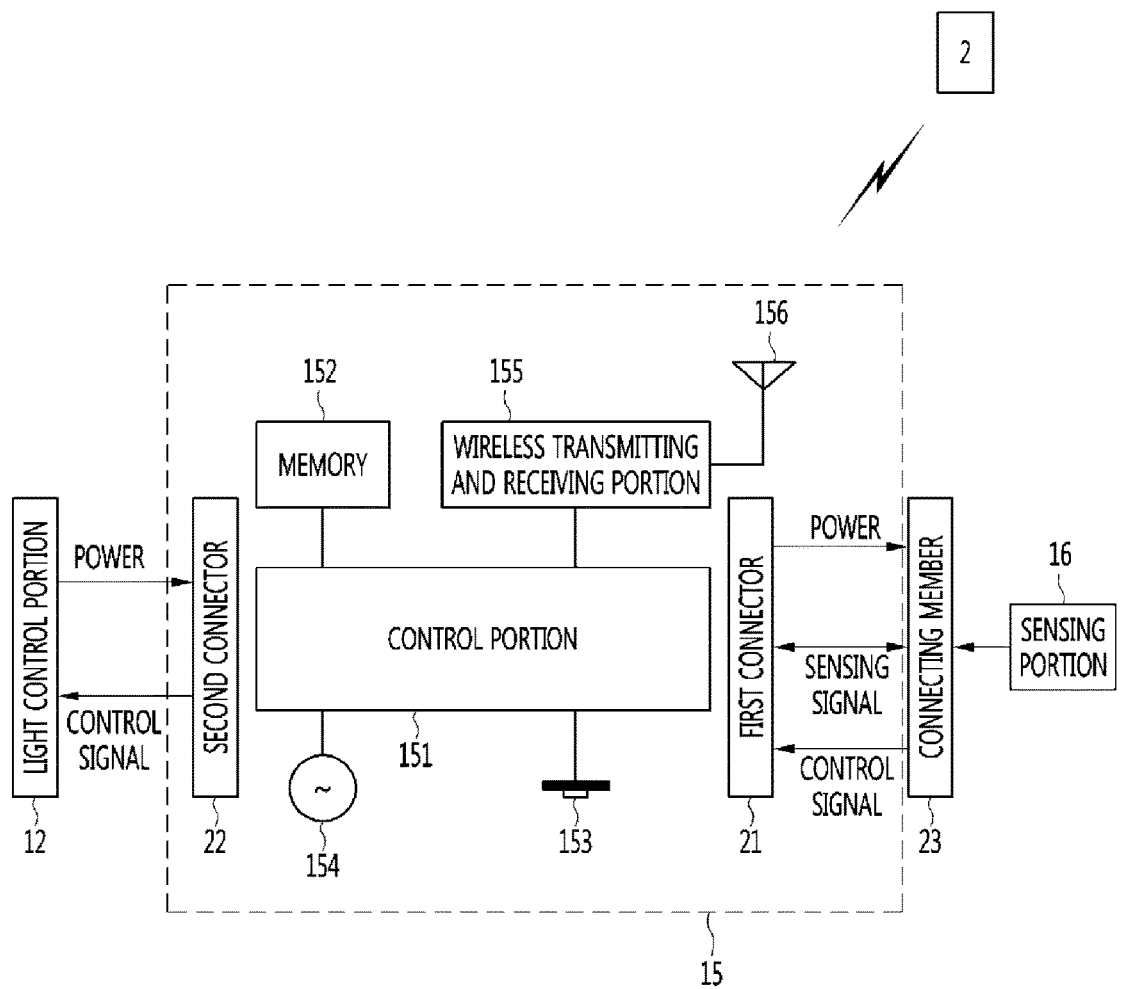
FIG. 2 is a block diagram illustrating a configuration of a main control module.

FIG. 2 is a block diagram illustrating a configuration of the main control module. Other embodiments and configurations may also be provided.

As shown in FIG. 2, the light control portion 12 may be connected (or coupled) to the main control module 15 by a second connector 22 in a wired communication method. The main control module 15 may receive power from the light control portion 12 through the second connector 22, and may transmit a control signal to the light control portion 12 through the second connector 22, and then adjust a light irradiation state of the light irradiation portion 11. Various methods such as DALI, 0-10 light control, PWM, UART, SPI, I2C, and RS-485 may be the wired communication method to perform signal transmission and reception.

The second connector 22 may include a mode pin. The control method of the light control portion 12 may be based on a signal that is read through the mode pin. For example, when the operation method of the light control portion 12 is pulse width modulation (PWM), then the light control portion 12 may transmit 0 V to the main control module 15 through the mode pin, and the main control module 15 may transmit the control signal to be sent to the light control portion 12 by using the PWM method, by recognizing that 0 V is applied to the mode pin.

The operation mode of the light control portion 12 may be set in advance by software processing and hardware processing, and various communication methods may be stored, in advance, in the main control module 15. The voltage setting of the mode pin may be variously changed according to type of the wired communication method and setting value of the light control portion 12. The mode pin may not be limited to being operated by the voltage value, and a mode may be transmitted by another setting value, such as a specific pulse method.

The sensing portion 16 may be connected to (or coupled to) the main control module 15 (by the wired communication method) by the first connector 21 and the connecting member 23. Power may be transmitted from the main control module 15 to the sensing portion 16 through the first connector 21, and a sensing signal of the sensing portion 16 may be transmitted to the main control module 15. A signal for controlling the sensor of the sensing portion 16 may also be transmitted. Various methods such as DALI, 0-10 light control, PWM, UART, SPI, I2C, and RS-485 may be applied as the wired communication method to perform signal transmission and reception.

Similar to the second connector 22, the first connector 21 may include a mode pin such that operation of the sensor may be reliably performed. For example, by applying different voltages to the mode pins according to types of the sensors, the main control module 15 may identify types of the sensors by using voltages that are applied to the mode pins, controlling the sensor by using different sensing signals from each other according to types of sensors, and recognizing the sensing signal from the sensor. The operation method of the mode pin may not be limited to the voltage value, and a mode may be transferred by another set value, such as a specific pulse type.

At least two sensors (refer to 162 and 163 in FIG. 7) may be provided as the sensors provided in the sensing portion 16. The sensing portion 16 may further include switches 161 and 164 to which a user may apply an input signal. This is because, since the sensing portion 16 is exposed to the outside, the user is capable of directly performing the operation even after the lighting device is installed. In this case, a control signal from the switch is capable of being transmitted to the main control module 15 through the first connector 21.

The detailed configuration of the sensing portion 16 will be described below.

The external device 2 may be connected (or coupled) to the main control module 15 in the wireless communication method by an antenna 156. As the wireless communication method, various methods such as ZigBee, Bluetooth, Wi-Fi, and sub-GHz may be applied to perform signal transmission and reception. For example, a ZigBee SoC may be provided as a control portion 151 (or controller) that entirely controls the main control module 15 so that the main control module 15 supports the Zig Bee method, and an EM 357 may be a more specific example.

The main control module 15 may include a quartz 154, which may be for time control of the control portion 151, a switch 165 for performing operations such as setting and resetting of the main control module 15, a memory 152 for storing a plurality of members of information for the antenna 156, and a wireless transmitting and receiving portion 155 for controlling signal transmission and reception through the antenna 156.

Various information may be stored in the memory 152. Therefore, when the sensing portion 16 and the light control portion 12 are replaced, information for the operation thereof may be read and used, and thus the lighting device may be continuously used without replacing the entire components.

When a large amount of information needs to be uploaded to the memory 152, the external storage device may be connected to the first connector 21 to upload the data. The first connector 21 may include a UART port. An advantage may be obtained in terms of time and power consumption as compared with an example of uploading information using the antenna 156 by a wireless communication.

Figure 3:
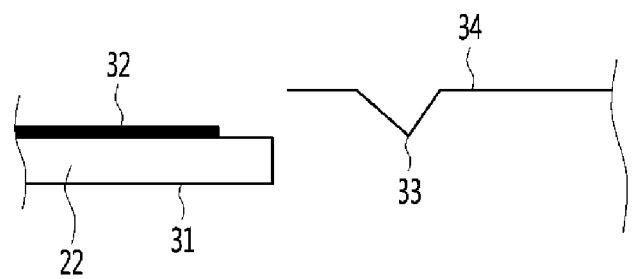
FIG. 3 is a side view illustrating insertion of a second connector.
Figure 4:
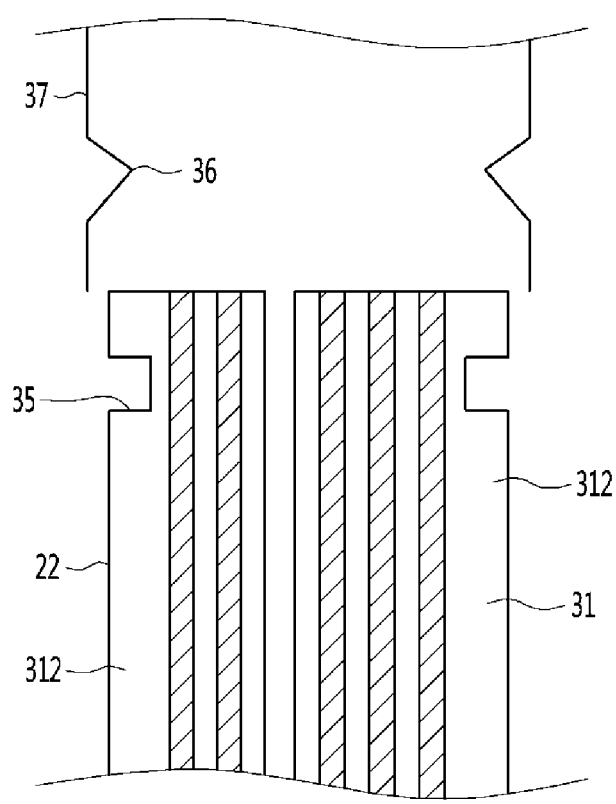
FIG. 4 is a plan view illustrating insertion of a second connector.

FIG. 3 and FIG. 4 are a side view and a plan view illustrating insertion of a second connector, respectively. Other embodiments and configurations may also be provided.

With reference to FIG. 3, the second connector 22 may include a printed circuit board 31, which extends from a main body of the main control module 15 to the outside, and a conductive layer 32, which is printed on an upper surface of the printed circuit board 31. A support member 34 and a contact point 33 may be provided at an inside of the light control portion 12 into which the second connector 22 is inserted.

The contact point 33 may be provided in a configuration in which the support member 34 is bent at an end of the support member 34. The contact point 33 and the conductive layer 32 may be in contact with each other, and thus signals are capable of being transmitted to each other.

Elasticity may be imparted to the support member 34 so as to improve reliability of the contact between the contact point 33 and the conductive layer 32, and thus the support member 34 may be elastically deformed during insertion and separation of the printed circuit board 31.

With reference to FIG. 4, recesses 35 may be formed at both side ends of the printed circuit board 31, and the support member 37 having a latching member 36, which is bent, may be disposed at a position corresponding to the recess 35 when insertion has been completed.

According to the above configurations, the insertion position may be fixed after the printed circuit board 31 is inserted into the support member 37. The printed circuit board 31 may be pulled out by a force that is enough to deform the support member 37.

Figure 5:
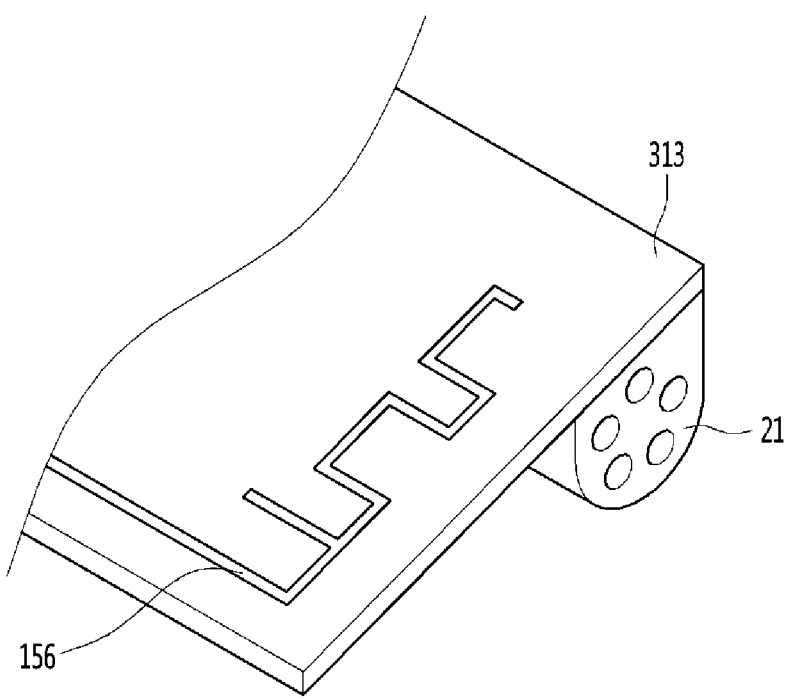
FIG. 5 is a view illustrating a periphery portion of a first connector when removed.

FIG. 5 is a view illustrating a periphery portion of a first connector when removed from the main control module. Other embodiments and configurations may also be provided.

As shown in FIG. 5, the first connector 21 may be fastened to a lower surface of the third printed circuit board 313, and the antenna 156 may be fastened to an upper surface of the third printed circuit board 313 in a predetermined shape. For example, the antenna 156 may be patterned on the third printed circuit board 313. The third printed circuit board 313 may act as a shielding film against electromagnetic waves generated from the first connector 21. Therefore, operation of the antenna 156 may be stably performed.

The first connector 21 may be positioned at a right side of the third printed circuit board 313 (with reference to the drawing) and the antenna 156 may be positioned at a left side of the third printed circuit board 313 (with reference to the drawing). Therefore, electromagnetic waves of the first connector 21 may not significantly affect the antenna 156.

The first printed circuit board 311, the second printed circuit board 312, and the third printed circuit board 313 may be provided as physically different articles from each other, or may be provided as a single article. A separate number may be given to each component in order to separately describe the configuration thereof, focusing on the position and the operation thereof.

Figure 6:
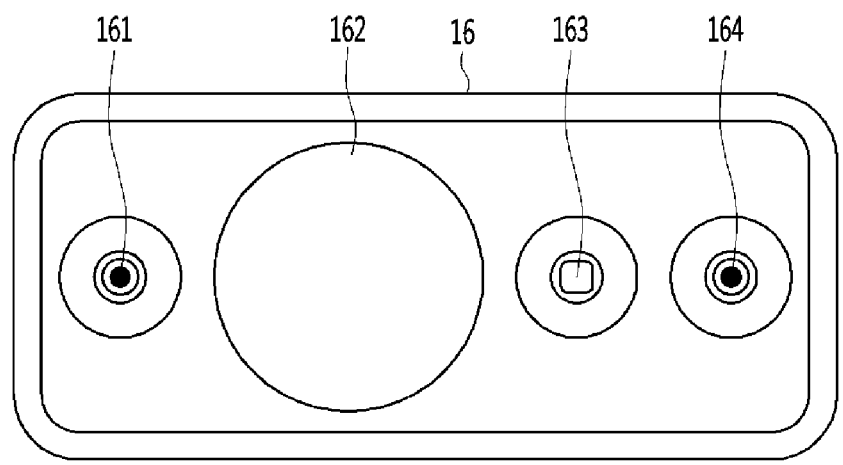
FIG. 6 is a view illustrating an outer appearance of the sensing portion.

FIG. 6 is a view illustrating an outer appearance of the sensing portion. Other embodiments and configurations may also be provided.

As shown in FIG. 6, the sensing portion 16 may include two switches 161 and 164 and two sensors 162 and 163. The two switches 161 and 164 may be provided on an outside of the sensors 162 and 163 to increase intuitiveness of the user.

The sensor may include a first sensor 162 and a second sensor 163. A moving body sensor that senses presence of a user using a movement may be used as the first sensor 162. A pyroelectric infrared motion sensor (PIR) may be used as the moving body sensor. An illuminance sensor may be used as the second sensor 163. The illuminance sensor may sense brightness of the environment on which the illuminator is disposed, and the illuminance sensor may be capable of recognizing day or night or sense the current illuminance.

The two switches may include a first switch 161 and a second switch 164.

A dim off time may be set using the first switch 161. The dim off time may be set in accordance with a number of times that the switch is pressed, such as 30 seconds, 10 minutes, and 20 minutes. The time set using the first switch 161 may be stored in memory of the main control module 15.

A reference brightness may be set using the second switch 164. As reference brightness, 100%, 80%, and 60% may be set corresponding to the number of times that the switch is pressed. The time set using the second switch 164 may be stored in memory of the main control module 15.

The operation related to the first switch 161 may be described as an example.

When the first sensor 162, which is the moving body sensor, senses entry of a user, the sensed signal transmits to the main control module 15, and the main control module 15 may control the light control portion 12 to operate the light irradiation portion 12. The dim off time, which is input through the first switch 161, may be preliminary input to the main control module 15. The main control module 15 may control the light control portion 12 to turn off operation of the light irradiation portion 11 when the dim off time elapses after the light irradiation portion 11 is operated.

The operation related to the second switch 163 may be described as an example.

When the first sensor 162, which is the moving body sensor, senses entry of a user, the sensed signal transmits to the main control module 15, and the main control module 15 controls the light control portion 12 to operate the light irradiation portion 12. At this time, if there is no reference brightness specified separately by the user, the light irradiation portion 11 may operate according to the reference brightness stored in advance in memory of the main control module 15.

Figure 7:
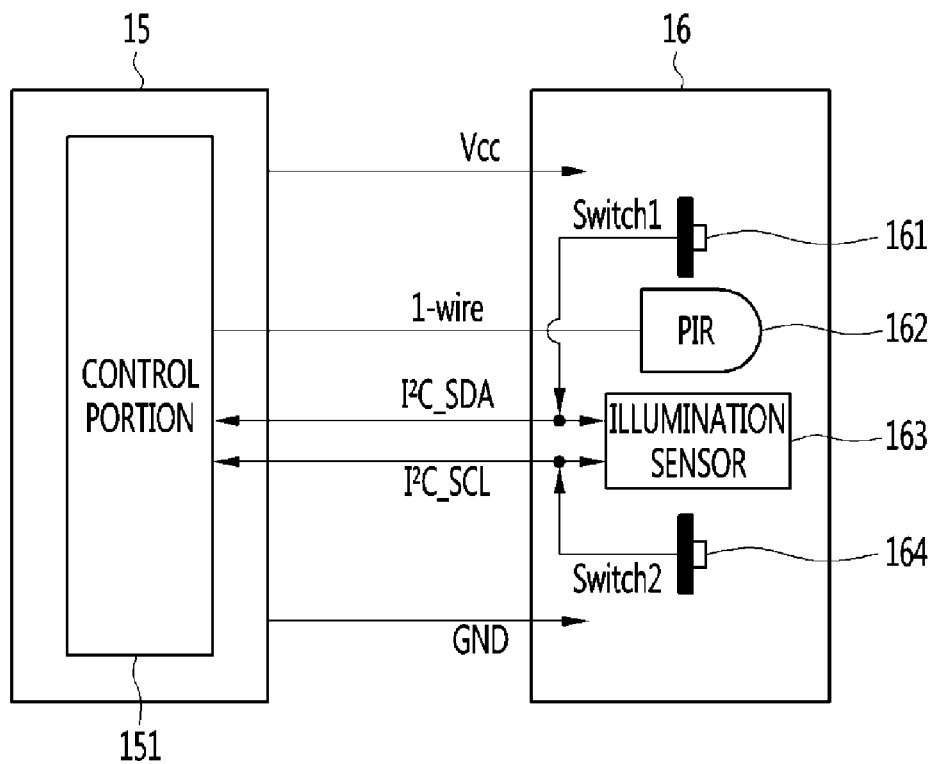
FIG. 7 is a view illustrating an interconnection relationship between a main control module and a sensing portion.

FIG. 7 is a diagram illustrating an interconnection relationship between the main control module 15 and the sensing portion 16. The function of the first connector may be described in more detail with reference to FIG. 7.

The main control module 15 and the sensing portion 16 may be connected (or coupled) to each other through five lines. Two lines of the five lines may be used for the power supplied from the main control module 15 to the sensing portion 16. One line may be used for the body sensor 162. Accordingly, two lines of the five lines may remain.

The illuminance sensor 163 may require two lines as a synchronous clock line and a data transmission/reception line in order to apply an I2C control method. Additionally, one line may be required per each of the switches 161 and 164.

In order to overcome the above problem, the second switch 164 and the synchronous clock line of the I2C control method may be connected (or coupled) together to the second pin, the first switch 161 and the data transmission/reception line of the I2C control method may be connected together to the third pin. According to this configuration, the number of pins of the first connector may be reduced by two, and the number of control lines may be reduced.

The operation states of the second pin and the third pin may be described with reference to a signal transmission state diagram between the main control module and the sensing portion as a control method of the lighting equipment.

Figure 8:
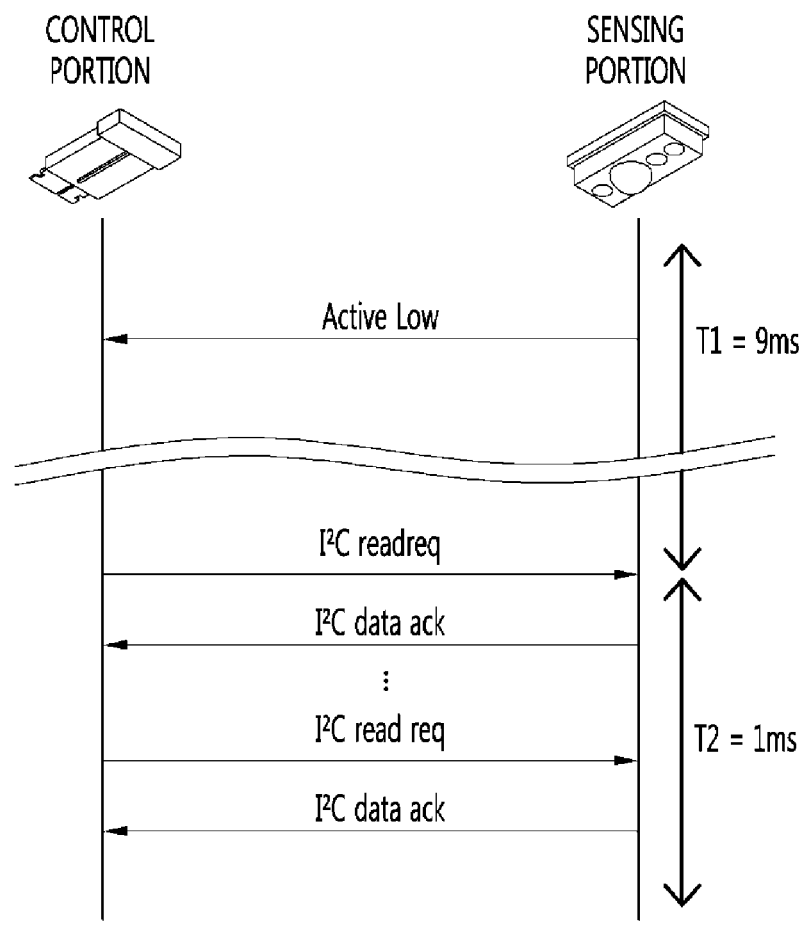
FIG. 8 is a view illustrating a method for controlling a lighting device.

FIG. 8 is a view illustrating a method for controlling a lighting device. Other embodiments and configurations may also be provided.

As shown in FIG. 8, the second pin and the third pin may be used for sensing a pressed state of the switch for a first predetermined time T1. The first time may be set to 9 ms. The second pin and the third pin may be used for sensing the signal state of the illuminance sensor during the second time T2 when the first time has elapsed. The second time may be set to 1 ms. The illuminance sensor 163 may be performed by synchronizing using the second pin and performing data transmission/reception using the third pin. Other control methods may be used for the communication method.

After the second time has elapsed, the first time may start again. Therefore, the time at which the switches 161 and 164 and the illuminance sensor 163 are used may be divided and used in a period in which the first time and the second time are added (i.e., a period of 10 ms). This may be called a time division method.

The first time may be very short as 9 ms, and the time that the user presses the switch may likely to be longer than 9 ms. Therefore, there is no example where the switch operation of the user may not be grasped in any cycle. As an example, the time the user holds the switch in a pressed state may be is (i.e., 1000 ms) so that depression of the button may be sensed for 100 cycles. Further, since the second time when the illuminance sensor 163 operates is very short as 1 ms, it may be considered that there is no possibility that depression of the switches 161 and 163 is not sensed.

Figure 9:
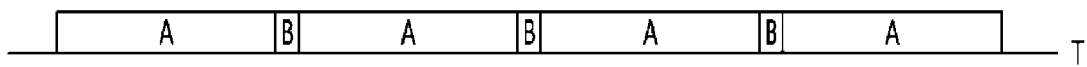
FIG. 9 is a time chart illustrating use of the second connector pin.

The use of the second connector pin, as described above, may be capable of being explained by the time chart shown in FIG. 9. With reference to FIG. 9, in the time table, an interval A may be a first time T1 and an interval B may be a second time T2. The interval of A may be occupied in order to determine whether or not the second pin and the third pin are pressed by the switches 161 and 164. On the other hand, the interval B may be used as the time when the second pin and the third pin read the illuminance through the illuminance sensor 163.

The switches 161 and 164 have been described as being installed in a portion exposed to outside of the light irradiating portion 11. This may make it possible to control a lighting device without using a complex on-line facility (e.g., a separate external device 1) after the lighting device 1 is installed. For example, the switches 161 and 164 may change the dim off time and the reference brightness.

The main control module 15 may be hardware reset by repeatedly pressing the switches 161 and 164 by a reference number of times. The reference number may be preset to 10, where 10 is a number of times that the user may not be pressed except for special cases. Of course, it may be set to any other number of times.

This hardware reset operation may be used when the main control module 15 does not operate normally after the illuminator is installed.

More specifically, after installation of the lighting device, the main control module 15 may be covered by the back surface of the lighting device. Therefore, hardware reset may not be performed by using a separate button provided in the main control module. In this example, wireless communication between the main control module 15 and the external device 1 may not be performed. At this time, the main control module 15 may be restarted by pressing the switches 161 and 164 a plurality of times.

By using a switch installed together in the sensing portion, operating convenience of the user may be further increased. The user may operate the lighting device more conveniently. In this example, there is no complication of control using an external device, control by wire may be performed, and thus a desired object may be achieved with a more secure operation.

According to an example embodiment, since the sensor and the switch are combined, the user may further enhance efficiency of the lighting device without supporting the complicated external device. As the sensor and switch are combined and additional communication lines are not needed, and thus an increase of manufacturing cost is capable of being suppressed to a maximum. A switch may be attached to the sensing portion to be exposed to the outside of the lighting device and thus the lighting device may operate more conveniently by the user. Thus, convenient use and installation of the lighting device may be further facilitated.

Embodiments may provide a lighting device and a method for controlling the lighting device. This may be capable of easily installing a system in which a sensor and a switch are combined by a user, and improving utility of the lighting device.

Embodiments may provide a lighting device and a method for controlling the lighting device for reducing a manufacturing cost by reducing a size of components and reducing a number of control lines.

Embodiments may provide a lighting device and a method for controlling the lighting device. This may be operated by a user more conveniently when an error occurs, wireless and user access is difficult, and/or resetting is impossible.

The lighting device may improve problems of structure thereof complicating and use thereof being difficult for the user by a sensor and a switch being provided separately or being integrated by a wireless communication. The lighting device may include a first connector and a switch. The first connector may be provided in a main control module and by which the main control module and the sensing portion is connected by wire. The switch may be provided in the sensing portion. The operating signal of the user may be input by the switch. The main control module may be provided separately and freely from the sensing portion.

The lighting device may use the same pin together with the switch and the sensor in order to reduce the size of the components of the sensing portion and reduce a number of control lines and control pins so as to ultimately reduce the manufacturing cost.

A method for controlling a lighting device for achieving an object may include features. For example, when a switch and a sensor perform transmission and reception of a signal from and to a main control module through the same line, using the line in transmission and reception between the main control module and the switch during a first time. Additionally, features may include using the line in transmission and reception between the main control module and the switch during a second time after the first time has lapsed. The first time and the second time after the second time has lapsed may be repeated.

The lighting device may reset the main control module by using the switch provided on the sensing portion to prevent reset of the lighting device from being capable of being performed since it is difficult for wireless and user to access.

According to an example embodiment, a lighting device may be provided in which a sensor and a switch are combined, without the need for a separate installer, and manufacturing cost of components may be reduced, and the user may conveniently operate the lighting device.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device, comprising:
  a light illumination portion to provide light;
  a light control portion to control power applied to the light illumination portion;
  a sensing portion that includes a sensor for sensing an environment of a space that receives light from the light illumination portion, and the sensing portion includes a switch for a user to provide an input;
  a control module to communicate with an external device by a wireless communication, and the control module to control the light control portion based on a control signal from the external device; and
  a first connector provided at the control module, and the first connector to couple the control module to the sensing portion.

2. The lighting device according to claim 1,
  wherein the control module is freely separated from the sensing portion.

3. The lighting device according to claim 1,
  wherein the sensor includes at least one of an illuminance sensor and a moving body sensor, and
  wherein the switch includes at least one of a dim off time adjusting switch and a reference brightness adjusting switch.

4. The lighting device according to claim 1,
  wherein the sensing portion includes at least two sensors and at least two switches.

5. The lighting device according to claim 1, wherein the first connector includes a first pin, wherein the switch to use the first pin, and the sensor to use the first pin.

6. The lighting device according to claim 5,
  wherein the switch includes a dim off time adjusting switch and a reference brightness adjusting switch,
  wherein the sensor includes a moving body sensor and an illuminance sensor, and the first connector includes at least five pins, and
  wherein at least two pins of the at least five pins of the first connector are assigned for power supply to the sensing portion,
  wherein at least one pin, other than the pin assigned to the sensing portion, is assigned to the moving body sensor, and
  wherein at least two pins, other than the pins assigned to the sensing portion and the moving body sensor, are assigned to both the switch and the illumination sensor.

7. The lighting device according to claim 6,
wherein different switches are coupled to each of the two pins that are assigned to the switch and the illumination sensor.
8. The lighting device according to claim 7,
wherein two pins are assigned for synchronous clock and data transmission/reception to the illumination sensor, respectively.
9. The lighting device according to claim 1,
wherein the switch is for resetting the control module.
10. The lighting device according to claim 1,
wherein the sensing portion and the control module are detachably coupled by wire.
11. The lighting device according to claim 1,
wherein the control module is detachably coupled to the light control portion by wire.
12. A method for controlling a lighting device, the lighting device includes a control module and a sensing portion coupled by wire, and the sensing portion includes a switch and a sensor, the method comprising:
when the switch and the sensor perform transmission and reception of a signal from and to the control module through a same line, using the line in transmission and reception between the control module and the switch during a first time;
using the line in transmission and reception between the control module and the switch during a second time after the first time has lapsed; and
repeating the first time and the second time after the second time has lapsed.
13. The method for controlling the lighting device according to claim 12,
wherein the sensor includes an illuminance sensor.
14. The method for controlling the lighting device according to claim 12,
wherein the switch includes a dim off time adjusting switch and a reference brightness adjusting switch.
15. The method for controlling the lighting device according to claim 14,
wherein the switch performs a reset function.
16. The method for controlling the lighting device according to claim 12,
wherein the first time is longer than the second time.
17. A lighting device, comprising:
a light illumination portion to provide light;
a light control portion to control power applied to the light illumination portion;
a sensing portion that includes a sensor and a switch, the sensor for sensing an environment of a space that receives light from the light illumination portion, and the switch to provide an input of a user;
a control module to communicate with an external device by a wireless communication, and the control module to control the light control portion based a control signal from the external device; and
a connector provided at the control module, and the connector to couple by wires, and the connector to separate the sensing portion from the control module.
18. The lighting device according to claim 17,
wherein the connector includes at least five pins.
19. The lighting device according to claim 17,
wherein at least one of the five pins of the connector is used together such that a signal of the switch and a signal of the sensor are processed in a time division method.
20. The lighting device according to claim 18, wherein:
two pins of the five pins of the connector are for power,
one pin of the five pins of the connector is for a moving body sensor,
two pins of the five pins of the connector are used together in a time division method for signals of a switch and an illuminance sensor.

* * * * *